(12) United States Patent
Forni

(10) Patent No.: US 12,015,320 B2
(45) Date of Patent: Jun. 18, 2024

(54) AIR GAP MAGNETIC COUPLING WITH COUNTERBALANCED FORCE

(71) Applicant: Agilent Technologies, Inc., Santa Clara, CA (US)

(72) Inventor: Ronald J. Forni, Lexington, MA (US)

(73) Assignee: Agilent Technologies, Inc., Santa Clara, CA (US)

( * ) Notice: Subject to any disclaimer, the term of this patent is extended or adjusted under 35 U.S.C. 154(b) by 547 days.

(21) Appl. No.: 16/869,459

(22) Filed: May 7, 2020

(65) Prior Publication Data

US 2021/0348607 A1 Nov. 11, 2021

(51) Int. Cl.
| | |
|---|---|
| *H02K 49/10* | (2006.01) |
| *F04C 15/00* | (2006.01) |
| *F04C 18/02* | (2006.01) |
| *F04C 27/00* | (2006.01) |
| *H02K 7/10* | (2006.01) |

(52) U.S. Cl.
CPC ....... *H02K 49/108* (2013.01); *F04C 15/0069* (2013.01); *H02K 7/10* (2013.01); *H02K 49/104* (2013.01); *F04C 18/0215* (2013.01); *F04C 27/005* (2013.01); *F05C 2225/00* (2013.01)

(58) Field of Classification Search
CPC .............. F04C 15/0069; F04C 18/0215; F04C 27/005; F05C 2225/00; H02K 7/10; H02K 49/10; H02K 49/104; H02K 49/108; H02K 2201/12
See application file for complete search history.

(56) References Cited

U.S. PATENT DOCUMENTS

| | | | |
|---|---|---|---|
| 2,417,850 A | 3/1947 | Winslow | |
| 3,512,901 A | 5/1970 | Law | |
| 4,111,614 A | 9/1978 | Martin et al. | |
| 4,896,754 A * | 1/1990 | Carlson | ................ H02K 49/104 464/29 |
| 6,520,754 B2 * | 2/2003 | Randolphi | ............ F04C 23/008 417/420 |

(Continued)

FOREIGN PATENT DOCUMENTS

| | | |
|---|---|---|
| CN | 207502472 U | 6/2018 |
| DE | 2307226 A1 | 8/1974 |

(Continued)

OTHER PUBLICATIONS

Extended European Search Report mailed on Oct. 4, 2021 for Application No. 21172573.4; 8 pages.
AIP Advances 7, 056647 (2017); https://doi.org/10.1063/1.4974494; Submitted: Sep. 23, 2016. Accepted: Oct. 28, 2016. Published Online: Feb. 3, 2017; Gang-Hyeon Jang, Min-Mo Koo, Jeong-Man Kim, and Jang-Young Choi.

(Continued)

*Primary Examiner* — Tulsidas C Patel
*Assistant Examiner* — Joshua Kiel M Rodriguez

(57) ABSTRACT

A magnetic coupling assembly includes a first balancing magnet positioned and surrounding drive magnets and, across a gap, a second balancing magnet and surrounding driven magnets. The drive magnets when rotated drive the driven magnets to rotate. The balancing magnets generate a repulsive force, which counterbalances an attractive force generated by the drive magnets and driven magnets. The assembly may be utilized in a pump for contactless coupling of a motor shaft to a pump shaft. The driven side of the assembly may be hermetically sealed, such as with a liquid crystal polymer boundary interposed in the gap.

9 Claims, 10 Drawing Sheets

(56) References Cited

U.S. PATENT DOCUMENTS

| | | |
|---|---|---|
| 7,425,121 B2 | 9/2008 | Wood et al. |
| 9,341,186 B2 | 5/2016 | Calhoun |
| 2011/0031837 A1 | 2/2011 | Kuritani et al. |
| 2011/0076136 A1* | 3/2011 | Small .................... F04D 25/026 |
| | | 415/124.2 |
| 2011/0167898 A1 | 7/2011 | Zhou et al. |
| 2015/0078927 A1 | 3/2015 | Forni |
| 2015/0162799 A1* | 6/2015 | Ilan .......................... F16F 15/03 |
| | | 310/90.5 |
| 2016/0036311 A1 | 2/2016 | Lee |
| 2018/0017053 A1 | 1/2018 | Schwarzer et al. |
| 2019/0245421 A1 | 8/2019 | Smith et al. |

FOREIGN PATENT DOCUMENTS

| | | |
|---|---|---|
| EP | 0356145 A2 | 2/1990 |
| GB | 2083595 A | 3/1982 |
| JP | 2013013216 A | 1/2013 |
| WO | 02057634 A1 | 7/2002 |

OTHER PUBLICATIONS

International Journal of Engineering & Technology; 2018; Design of Axial Flux Type Permanent Magnet Coupling with Halbach Magnet Array for Optimal Performance Considering Eddy Current Loss Reduction Using 3-D Finite Element Method; Gang-Hyeon Jang, Sung-Won Seo, Chang-Woo Kim, Kyung-Hun Shin, Junghyo Nah, Jang-Young Choi; pp. 1-4.

Thierry Lubin, Mezani Smail, Abderrezak Rezzoug. Simple Analytical Expressions for the Force and Torque of Axial Magnetic Couplings. IEEE Transactions on Energy Conversion, Institute of Electrical and Electronics Engineers, 2012, 11 p. 10.1109/TEC.2012.2183372. hal-00673920.

Thierry Lubin, Smail Mezani, Abderrezak Rezzoug. Experimental and Theoretical Analysis of Axial Magnetic Coupling under Steady-State and Transient Operation. IEEE Transactions of Industrial Electronics, Institute of Electrical and Electronics Engineers, 2014, 61 (8), 9 p. 10.1109/TIE.2013.2266087. hal-00833962.

Villalobos, Nickolas Cruz Jr., "Transferring Power through a Magnetic Couple" (2019). Senior Theses. 42. https://digitalcommons.linfield.edu/physstud_theses/42.

* cited by examiner

AIR GAP MAGNETIC COUPLING WITH COUNTERBALANCED FORCE

TECHNICAL FIELD

The present invention relates to an air gap magnetic coupling, particularly configured to exhibit a counterbalance to the attractive force generated between a drive side and a driven side of the magnetic coupling. The invention also relates to assemblies in which the magnetic coupling may be provided, such as pump assemblies.

BACKGROUND

A shaft coupling is utilized in various applications to transmit power (in particular, to transfer torque) from one shaft (the drive shaft) to another shaft (the driven shaft). As a general example, a shaft coupling may couple a prime mover (e.g., an electric motor) to the rotating component (rotor) of a device or machine, whereby the power supplied or generated by the prime mover is utilized to drive the rotation of the rotor. Various types of pumps (e.g., scroll pump, rotary vane pump, gear pump, screw pump, Roots-type pump, claw pump, etc.) have one or more pump rotors that require such power.

Many pumping applications require the pump components to be hermetically sealed (i.e., isolated in a fluid-tight or leak-free manner) from the ambient environment outside of the pump. In particular, the driven side of the shaft coupling may need to reside within the confines of the hermetic sealing envelope, as well as the pumping components that act on the working fluid (the liquid or gas being pumped). Helium recirculation is one example where a hermetic vacuum pump is required. It is recognized by persons skilled in the art that hermeticity has two components, which are defined by 1) a leakage rate and 2) a permeation rate. In systems that use helium or other light gases, the hermeticity of the system is usually dominated by the permeation rate of the light gas through the sealing o-rings and any polymer barriers in the system. Typically, the permeation rate can be several orders of magnitude larger than the leakage rate in light gas applications, requiring the selection of special sealing and barrier materials with a low permeation rate. Hermetic pumps may be required to control fluid pressure inside the pump, such as a desired vacuum level in the case of a vacuum pump, and/or to prevent contamination such as by leakage of lubricants, solid particles, and/or the working fluid from the pump. Known components for realizing a hermetic pump add significant cost. Examples include a magnetic (shaft) coupling, an orbiting bellows in the case of a scroll compressor or vacuum pump, a canned motor, and a ferrofluidic seal. It would be desirable to provide a lower-cost solution for a hermetic pump than those currently known, and further which has the potential for both a low leakage rate and low permeation rate for both the system gases and ambient gases (i.e. air).

In addition, many types of shaft couplings are mechanical shaft couplings. That is, they require a direct physical connection between the coupling component(s) on the drive (e.g., motor) side and the coupling component(s) on the driven (e.g., pump head) side. Such a shaft coupling is problematic when utilized with a hermetic pump, as a portion of the shaft coupling must physically cross or pass through the hermetic barrier of the pump. Such an arrangement requires special shaft seals (particularly on the driven side) to maintain the integrity of the hermetic barrier. However, the performance of such shaft seals can be unreliable, they require maintenance, and they can have limited service life.

As an alternative to intrusive mechanical shaft couplings, a magnetic coupling may be utilized. A magnetic coupling includes one or more drive magnets and one or more driven magnets separated by an air gap, thereby establishing magnetic fields in the air gap between the drive magnet(s) and driven magnet(s). The associated magnetic forces are utilized in a known manner to transfer the torque from the drive shaft to the driven shaft without any contact between the drive side and the driven side of the magnetic coupling. This configuration enables a separating wall to be positioned in the air gap between the drive side and the driven side. The separating wall can form a part of a hermetic barrier for a hermetic pump, provided it is made from a material with a low permeation rate for both the working fluid in the system and the ambient gases (e.g., nitrogen, oxygen, water). A metallic material might seem to be an obvious choice for the barrier material except for the fact that an electrically conductive material is disadvantageous in the context of a magnetic coupling. In particular, an electrically conductive material would result in excessive power loss and heat build-up in the hermetic barrier material in the air gap region caused by eddy currents generated by the time-varying magnetic fields in the conductive barrier material. It is therefore critical that the hermetic barrier material in the air gap region of the magnetic coupling be an electrically non-conductive, low-cost material that is also resistant to permeation, especially for light gases such as helium and hydrogen. The hermetic barrier material would also need to resist permeation of water, nitrogen, and oxygen to avoid contamination of the system from atmospheric gases permeating into the system (e.g., a helium recirculation system). A further requirement of the barrier material is that it have a sufficient structural modulus, yield strength, and low creep rate to prevent excessive deflection or structural failure caused by the pressure differential across the barrier material. It would therefore be desirable to provide a special barrier material that meets one or more, and preferably all, of these potentially conflicting requirements (e.g., low permeation, low cost, non-conductive, high modulus of elasticity, high yield strength, and low creep rate).

As other advantages, a magnetic coupling may eliminate the need for the shaft seals noted above. Also, a magnetic coupling is intrinsically torque-limiting in that it will not transfer torque greater than a certain maximum value ("pull-out" torque), and thus provides self-protection against an overload condition. Further, a magnetic coupling allows for an appreciable amount of tolerance for misalignment between the drive shaft and driven shaft.

Magnetic couplings having radial configurations have been utilized. A radial magnetic coupling includes a ring-shaped outer magnet coaxially surrounding a ring-shaped inner magnet. Both magnets rotate about the central axis of the magnetic coupling, with one driving the rotation of the other. Accordingly, the air gap between the magnets is cylindrical and parallel with the central axis. Radial couplings have been provided with gear pumps and rotary vane pumps. Examples of these configurations are respectively disclosed in U.S. Pat. Nos. 4,111,614 and 7,425,121, the entire contents of which are incorporated by reference herein. However, the radial configuration can add complexity and cost to the pump along with a larger hermetic barrier in comparison to an axial configuration (described below). The larger hermetic barrier typically requires additional surface area in the radial air gap region that increases the permeation rate compared to an axial air gap coupling, as well as creating assembly difficulties that arise from one coupling component tending to attract the other coupling component with a large attractive force during the assembly process.

Magnetic couplings having axial configurations also have been utilized. In axial magnetic coupling, a set of drive magnets and a set of driven magnets are arranged about a common axis of rotation, and are separated by an axial air gap. Examples of these configurations are disclosed in Lubin et al., Simple Analytical Expressions for the Force and Torque of Axial Magnetic Couplings. IEEE Transactions on Energy Conversion, Institute of Electrical and Electronics Engineers, 2012, 11 p. 10.1109/TEC.2012.2183372. hal-00673920; Lubin et al., Experimental and Theoretical Analysis of Axial Magnetic Coupling under Steady-State and Transient Operation. IEEE Transactions on Industrial Electronics, Institute of Electrical and Electronics Engineers, 2014, 61 (8), 9 p. 10.1109/TIE.2013.2266087. hal-00833962; Jang et al., Torque characteristic analysis and measurement of axial flux-type non-contact permanent magnet device with Halbach array based on 3D analytical method, AIP Advances 7, 056647 (2017), doi.org/10.1063/1.4974494; and Jang et al., Design of Axial Flux Type Permanent Magnet Coupling with Halbach Magnet Array for Optimal Performance Considering Eddy Current Loss Reduction Using 3-D Finite Element Method, International Journal of Engineering & Technology, 7 (3.34) (2018) 184-187; the entire contents of each of which are incorporated by reference herein. An axial air gap magnetic coupling could potentially offer a simpler and lower cost solution in comparison to a radial magnetic coupling. However, axial magnetic couplings of known designs produce a significant axial force. In a typical application such as a pump, this axial force must be reacted by the bearings of the system associated with the transfer of motorized power to the load (e.g., the pump head), such as motor bearings and pump shaft bearings. However, the bearings typically provided are not designed to bear the large axial forces generated by an axial magnetic coupling. Consequently, the incorporation of an axial magnetic coupling into the typical application would require non-standard components to accommodate such axial forces, and thereby offset any cost reduction that might be realized with the utilization of the axial magnetic coupling.

In view of the foregoing, there is an ongoing need for improved magnetic couplings and the implementation of magnetic couplings to pumping applications.

SUMMARY

To address the foregoing problems, in whole or in part, and/or other problems that may have been observed by persons skilled in the art, the present disclosure provides methods, processes, systems, apparatus, instruments, and/or devices, as described by way of example in implementations set forth below.

According to one embodiment, a magnetic coupling assembly includes: a drive shaft rotatable on a drive axis; a driven shaft rotatable on the drive axis; a drive magnet assembly coupled to the drive shaft and rotatable therewith, the drive magnet assembly comprising a first balancing magnet positioned on the drive axis, and a drive magnet coaxially positioned with the first balancing magnet; and a driven magnet assembly coupled to the driven shaft and rotatable therewith, the driven magnet assembly comprising a second balancing magnet disposed on the drive axis, and a driven magnet coaxially positioned with the second balancing magnet, wherein: the drive magnet assembly is spaced from the driven magnet assembly by an axial gap, with the first balancing magnet facing the second balancing magnet across the axial gap, and the drive magnet facing the driven magnet across the axial gap; the drive magnet and the driven magnet are configured to drive rotation of the driven magnet in response to rotation of the drive magnet, and to generate a tangential drive force and an axial attractive force between the drive magnet and the driven magnet; and the first balancing magnet and the second balancing magnet are configured to generate an axial repulsive force between the first balancing magnet and the second balancing magnet that counterbalances the axial attractive force.

According to one embodiment, a magnetic coupling assembly includes: a drive shaft rotatable on a drive axis; a drive shaft rotatable on a drive axis; a driven shaft rotatable on the drive axis; a drive magnet assembly coupled to the drive shaft and rotatable therewith; a driven magnet assembly coupled to the driven shaft and rotatable therewith, wherein: the drive magnet assembly is spaced from the driven magnet assembly by a gap; and the drive magnet assembly and the driven magnet assembly are configured to drive rotation of the driven magnet assembly in response to rotation of the drive magnet assembly; and a structural boundary disposed in the gap between the drive magnet assembly and the driven magnet assembly, wherein the structural boundary is composed of a liquid crystal polymer. In an embodiment, the structural boundary at least partially encloses the driven magnet assembly.

In an embodiment, the drive magnet assembly comprises a first balancing magnet, the driven magnet assembly comprises a second balancing magnet, and the first balancing magnet and the second balancing magnet are configured to generate a repulsive force between the first balancing magnet and the second balancing magnet that balances the attractive force. In a further embodiment, the drive magnet assembly comprises a plurality of drive magnets circumferentially spaced from each other about the drive axis and surrounding the first balancing magnet, and the driven magnet assembly comprises a plurality of driven magnets circumferentially spaced from each other about the drive axis and surrounding the second balancing magnet.

In an embodiment, the gap is an axial gap, and the drive magnet assembly and the driven magnet assembly are configured to generate the attractive force as an axial attractive force. In another embodiment, the gap is a radial gap relative to the drive axis, and the drive magnet assembly and the driven magnet assembly are configured to generate the attractive force as a radial attractive force.

In an embodiment, the drive magnet assembly comprises a plurality of drive magnets circumferentially spaced from each other about the drive axis, and the driven magnet assembly comprises a plurality of driven magnets circumferentially spaced from each other about the drive axis.

According to another embodiment, a pump assembly includes: a magnetic coupling assembly according to any of the embodiments described herein; a pump head comprising a fluid inlet and a fluid outlet; and a pumping stage disposed in the pump head and communicating with the fluid inlet and the fluid outlet, the pumping stage comprising a pump rotor communicating with the driven shaft and rotatable therewith, wherein rotation of the drive shaft drives rotation of the pump rotor via the magnetic coupling assembly, and the pumping stage is configured to pump fluid from the fluid inlet to the fluid outlet in response to the rotation of the pump rotor.

According to another embodiment, a method for operating a magnetic coupling assembly includes: providing the magnetic coupling assembly with a drive magnet assembly and a driven magnet assembly spaced from each other by an axial gap along a drive axis, wherein the drive magnet assembly and the driven magnet assembly are coupled by a magnetic coupling and generate a tangential drive force and an axial attractive force across the axial gap; rotating the drive magnet assembly about the drive axis to drive rotation of the driven magnet assembly about the drive axis via the magnetic coupling; and rotating the drive magnet assembly about the drive axis to drive rotation of the driven magnet assembly about the drive axis via the magnetic coupling; and balancing the axial attractive force by generating an axial repulsive force between the drive magnet assembly and the driven magnet assembly.

According to another embodiment, a method for pumping fluid includes: operating a magnetic coupling assembly according to any of the embodiments described herein, wherein: a pump rotor of a pumping stage communicates with the driven shaft; and the operating of the magnetic coupling assembly drives rotation of the pump rotor such that fluid flows from a fluid inlet, through the pumping stage, and to a fluid outlet.

According to any of the foregoing embodiments, a structural boundary may be disposed in the axial gap between the drive magnet assembly and the driven magnet assembly, wherein the structural boundary is composed of an electrically insulating material. In an embodiment, the electrically insulating material is a polymer, such as a liquid crystal polymer, or a ceramic such as a suitable glass composition.

According to any of the foregoing embodiments, a casing may enclose the driven magnet assembly. In an embodiment, the casing is configured to fluidly isolate the driven magnet assembly from an ambient outside of the casing. In an embodiment, the casing includes or is attached to a structural boundary as disclosed herein. In an embodiment, the casing is part of or is attached to a pump head.

According to any of the foregoing embodiments, the first balancing magnet may include a first inside face and have a first polarity (e.g., north or south) at the first inside face, the second balancing magnet may include a second inside face facing the first inside face across the axial gap and have a second polarity (e.g., north or south) at the second inside face, and the first polarity and the second polarity are the same.

According to any of the foregoing embodiments, the drive magnet comprises a plurality of drive magnets circumferentially spaced from each other about the drive axis and surrounding the first balancing magnet, and the driven magnet comprises a plurality of driven magnets circumferentially spaced from each other about the drive axis and surrounding the second balancing magnet.

According to any of the foregoing embodiments, the drive magnet comprises a plurality of drive magnets circumferentially arranged with alternating polarities about the drive axis, and the driven magnet comprises a plurality of driven magnets circumferentially arranged with alternating polarities about the drive axis;

Alternatively in any of the foregoing embodiments, the drive magnet comprises an annular structure magnetized with a plurality of dipole circumferentially arranged with alternating polarities about the drive axis, and the driven magnet comprises an annular structure magnetized with a plurality of dipole circumferentially arranged with alternating polarities about the drive axis.

Alternatively in any of the foregoing embodiments, the drive magnet is configured as a Halbach array, and the driven magnet is configured as a Halbach array.

According to any of the foregoing embodiments, a pump rotor may communicate with the driven shaft and be rotatable therewith. In various embodiments, the pump rotor may be an orbiting scroll, a rotary vane component, a crank, a cam, a gear, a screw, a Roots lobe, or a claw.

According to any of the foregoing embodiments, the pumping stage may be a scroll pumping stage, a rotary vane pumping stage, a gear pumping stage, a screw compressor stage, a Roots pumping stage, or a claw pumping stage.

According to any of the foregoing embodiments, the pump rotor is part of a scroll pumping stage and comprises an orbiting scroll blade. The pumping stage further comprises a stationary scroll blade nested with the orbiting scroll blade. The orbiting scroll blade is configured to move in an orbiting manner relative to the stationary scroll blade in response to rotation of the driven shaft, to create a moving pocket between the orbiting scroll blade and the stationary scroll blade effective to pump fluid.

In an embodiment, the pumping stage further comprises a crank positioned in eccentric relation to the driven shaft and configured to move in an orbiting manner in response to rotation of the driven shaft, and the orbiting scroll blade is coupled to the crank.

According to any of the foregoing embodiments, a motor is configured to drive rotation of the drive shaft.

In an embodiment of the method for operating a magnetic coupling assembly, generating the axial repulsive force comprises providing the drive magnet assembly with a first balancing magnet, and providing the driven magnet assembly with a second balancing magnet facing the first balancing magnet across the axial gap. In an embodiment, the first balancing magnet and the second balancing magnet are positioned on the drive axis.

In an embodiment of the method for operating a magnetic coupling assembly, the drive magnet assembly and the driven magnet assembly comprise any the configurations disclosed herein.

In an embodiment of the method for operating a magnetic coupling assembly, generating the axial repulsive force comprises providing the drive magnet assembly with a first balancing magnet surrounded by the drive magnet or magnets, and providing the driven magnet assembly with a second balancing magnet surrounded by the driven magnet or magnets and facing the first balancing magnet across the axial gap.

In an embodiment of the method for operating a magnetic coupling assembly, the method includes inserting a structural boundary in the axial gap between the drive magnet assembly and the driven magnet assembly, wherein the structural boundary is composed of an electrically insulating material according to any of the embodiments disclosed herein.

In an embodiment of the method for pumping fluid, the operating of the magnetic coupling assembly comprises operating a motor to drive rotation of the drive shaft.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The invention can be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION

Figure 1:
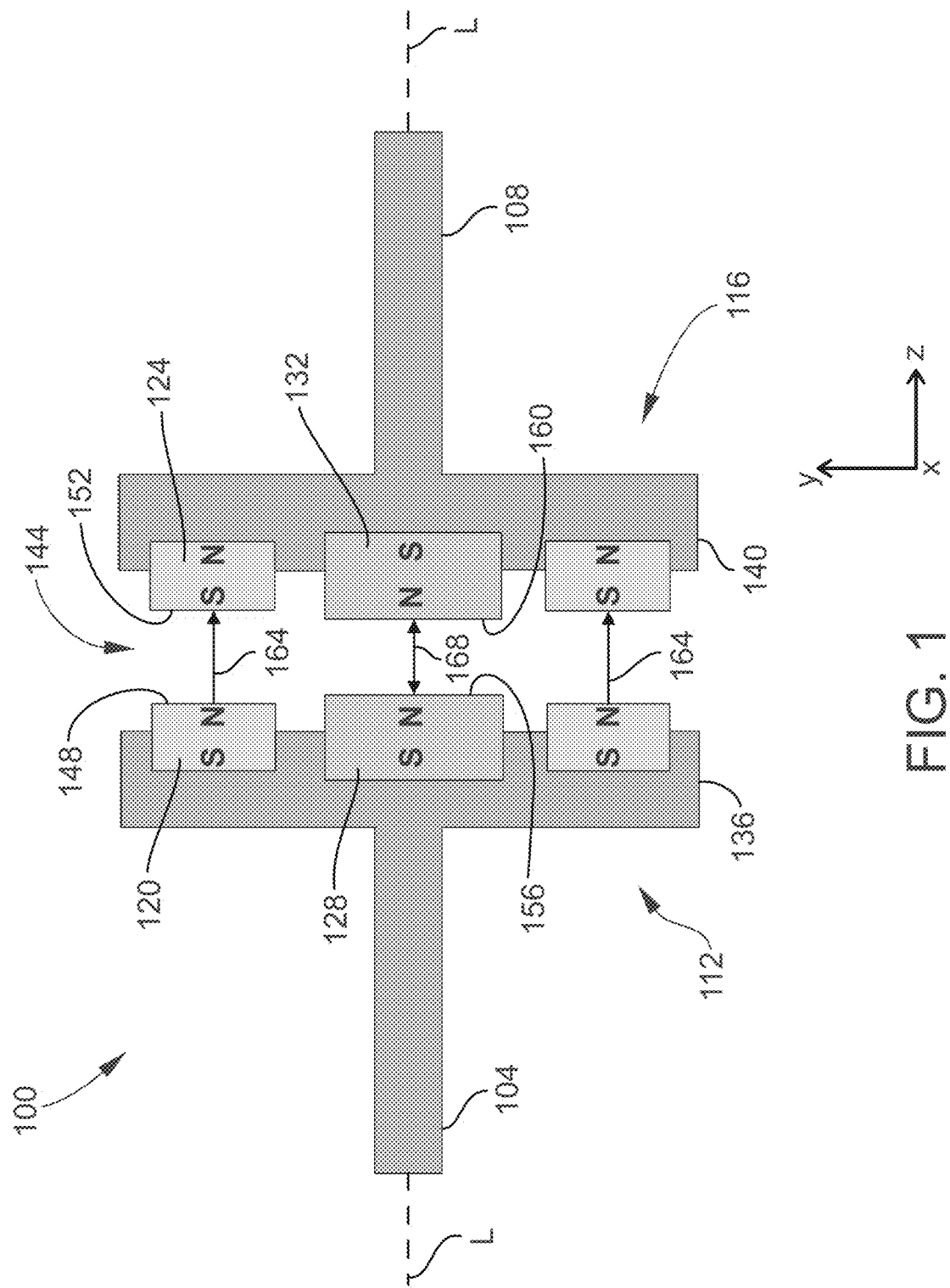
FIG. 1 is a schematic cross-sectional view of an example of a (balanced) axial magnetic coupling assembly 100 according to an embodiment of the present disclosure.

FIG. 1 is a schematic cross-sectional view of an example of a ("balanced" or "counterbalanced" as defined herein) axial magnetic coupling assembly 100 according to an embodiment of the present disclosure. For reference purposes, the axial magnetic coupling assembly 100 may be considered as being arranged along a drive axis L, which corresponds to the axis of rotation of the axial magnetic coupling assembly 100, and may further correspond to the central, longitudinal axis of the axial magnetic coupling assembly 100. Also, for reference purposes, FIG. 1 includes an arbitrarily positioned Cartesian (x-y-z) frame of reference. In this example, the drive axis L corresponds to the z-axis, and the transverse plane orthogonal to the drive axis L corresponds to the x-y plane. In the context of the present disclosure, the term "axial" relates to the drive axis L or a direction generally parallel to the drive axis L.

The axial magnetic coupling assembly 100 generally includes a drive (driving) shaft 104 and a driven shaft 108, both of which are rotatable on the drive axis L. The axial magnetic coupling assembly 100 also generally includes a drive (driving) magnet assembly 112 coupled to the drive shaft 104 and thereby rotatable with the drive shaft 104, and a driven magnet assembly 116 coupled to the driven shaft 108 and thereby rotatable with the driven shaft 108. The drive magnet assembly 112 includes a drive magnet 120, and the driven magnet assembly 116 includes a driven magnet 124. The drive magnet 120 and the driven magnet 124 each may include one or more distinct magnets. That is, the drive magnet 120 may include a single drive magnet or a plurality of drive magnets, and the driven magnet 124 may include a single driven magnet or a plurality of driven magnets. In the present embodiment, the drive magnet assembly 112 includes a plurality of peripheral drive (driving) magnets 120 arranged in an array or pattern in the transverse plane. Similarly, the driven magnet assembly 116 includes a plurality of peripheral driven magnets 124 arranged in an array or pattern in the transverse plane. Only one diametrically opposite pair of drive magnets 120, and only one diametrically opposite pair of driven magnets 124, are shown in FIG. 1.

According to an aspect of the present disclosure, the drive magnet assembly 112 further includes a first (drive-side) balancing magnet 128 and the driven magnet assembly 116 further includes a second (driven-side) balancing magnet 132, both of which are centrally positioned on the drive axis L. The drive magnets 120 coaxially surround the first balancing magnet 128, and the driven magnets 124 coaxially surround the second balancing magnet 132. The first balancing magnet 128 and the second balancing magnet 132 are described further below.

In an embodiment, the drive magnet(s) 120, driven magnet(s) 124, first balancing magnet 128, and second balancing magnet 132 are permanent magnets. Thus, these magnets may be composed of, for example, a suitable alloy such as (permanently magnetized) neodymium (i.e., neodymium alloyed primarily with iron and boron), alnico (i.e., iron alloyed primarily with aluminum, nickel, and cobalt), a hard ferrite (i.e., an iron oxide-containing ceramic), etc.

The drive magnet assembly 112 may further include a drive magnet support structure 136. The drive magnet support structure 136 is configured to couple the drive magnet assembly 112 to the drive shaft 104, and to support and fix the positions of the drive magnets 120 and the first balancing magnet 128 relative to each other and to the drive axis L. Thus, the drive magnets 120 are mounted to (e.g., attached to, secured to, or otherwise retained or held by) the drive magnet support structure 136, and are thereby coupled to and rotatable about the drive shaft 104. Similarly, the driven magnet assembly 116 may further include a driven magnet support structure 140. The driven magnet support structure 140 is configured to couple the driven magnet assembly 116 to the driven shaft 108, and to support and fix the positions of the driven magnets 124 and the second balancing magnet 132 relative to each other and to the drive axis L. Thus, the driven magnets 124 are mounted to (e.g., attached to, secured to, or otherwise retained or held by) the driven magnet support structure 140, and are thereby coupled to and rotatable about the driven shaft 108. For all such purposes, the drive magnet support structure 136 and the driven magnet support structure 140 each may include one or more structural components as needed. Moreover, depending on the configuration of the various magnets, all or part of the drive magnet support structure 136 and the driven magnet support structure 140 may serve as a magnetic or magnetizable yoke to complete the circuit for the magnetic flux of corresponding magnets. For example, all or part of the drive magnet support structure 136 and the driven magnet support structure 140 may be composed of a ferromagnetic material such as soft iron, nickel, cobalt, etc., and certain alloys thereof.

The drive magnet assembly 112 and the driven magnet assembly 116 are spaced from each other (along the drive axis L) by an axial gap 144, for example an air gap. The array of drive magnets 120 and the array of driven magnets 124 face each other across the axial gap 144. Likewise, the first balancing magnet 128 and the second balancing magnet 132 face each other across the axial gap 144. Specifically, the drive magnets 120 have (first) inside faces 148 facing the axial gap 144, the driven magnets 124 have (second) inside faces 152 facing the axial gap 144 and facing the drive magnets 120, the first balancing magnet 128 has a (first) inside face 156 facing the axial gap 144, and the second balancing magnet 132 has a (second) inside face 160 facing the axial gap 144 and facing the first balancing magnet 128.

Figure 2A:
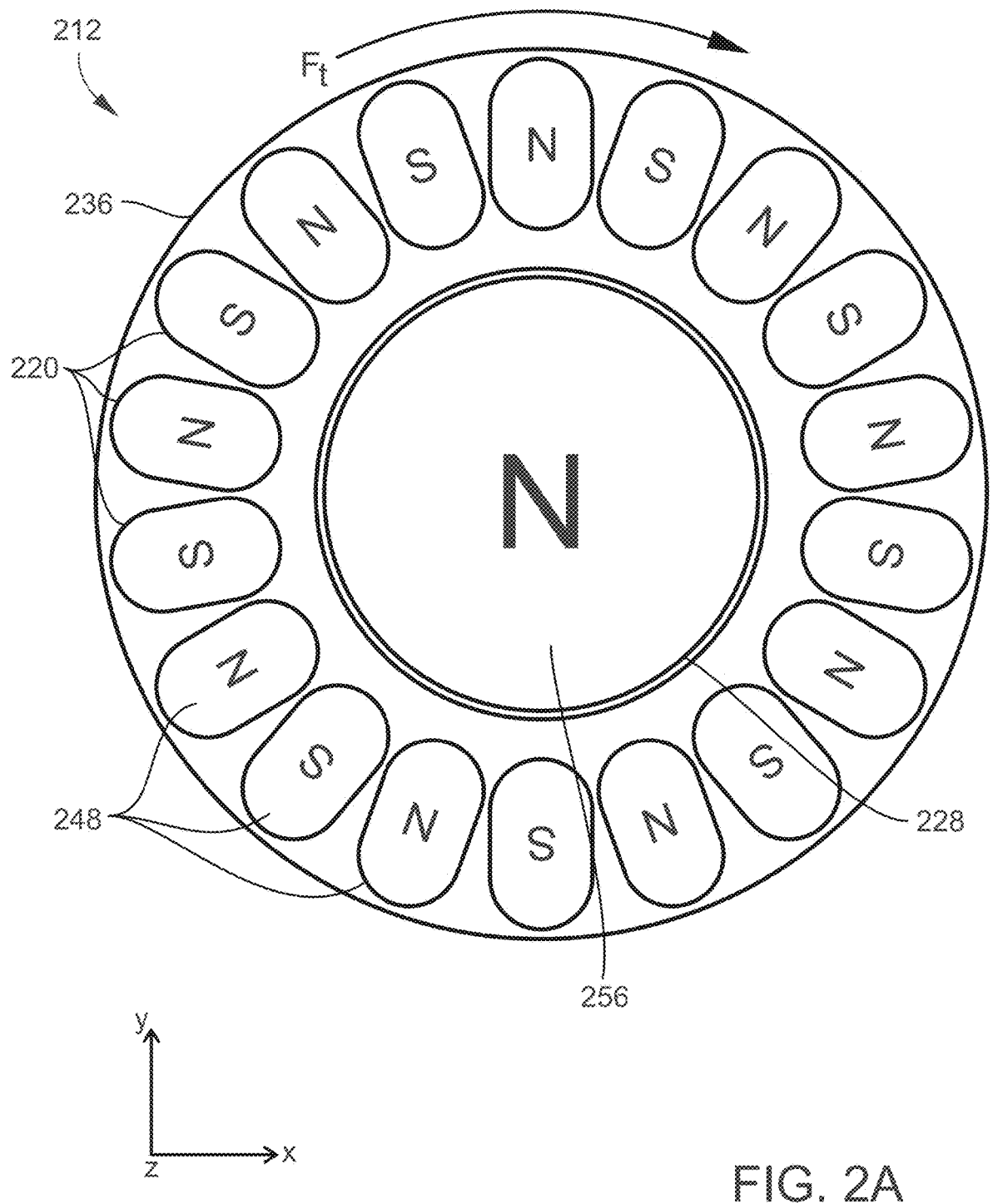
FIG. 2A is a schematic plan view of an example of a magnet assembly according to an embodiment of the present disclosure.

FIG. 2A is a schematic plan view of an example of a magnet assembly 212 according to an embodiment. The magnet assembly 212 includes a balancing magnet 228 positioned on the drive (central) axis, and a plurality of peripheral magnets 220 circumferentially spaced from each other about the drive axis (at a radial distance from the drive axis) and coaxially surrounding the balancing magnet 228. The balancing magnet 228 and peripheral magnets 220 are mounted to and supported by an appropriately configured magnet support structure 236 that can be coupled to a shaft for rotation with the shaft. To provide balanced and uniform (and rotationally symmetric) magnetic fields and axial forces, the peripheral magnets 220 all have the same size, shape, and position relative to each other. As to the latter, the peripheral magnets 220 are circumferentially spaced at equal distances from each other and with the same angular orientation relative to the drive axis, and are radially spaced at equal distances from the drive axis and thus from the centrally located balancing magnet 228. Generally, the peripheral magnets 220 may have any (preferably symmetrical) shape, which may be rounded, polygonal, or have a combination of rounded and polygonal (e.g., straight-edged features). In the illustrated embodiment, by way of example only, the peripheral magnets 220 have racetrack shapes.

FIG. 2A in particular is a plan view of the inner side, or gap side, of the magnet assembly 212 (namely, the side facing the axial gap when assembled as part of an axial magnetic coupling), thus showing inside faces 248 of the peripheral magnets 220 and an inside face 256 of the balancing magnet 228. In an embodiment, the peripheral magnets 220 and the balancing magnet 228 are configured (e.g., magnetized) as north-south (N-S) magnetic dipoles. The peripheral magnets 220 and the balancing magnet 228 are oriented such that the north and south poles are located on the inside faces 248 and 256 and on the axially opposite outside faces. By this configuration, the magnetic flux is directed axially through the thickness of the peripheral magnets 220 and the balancing magnet 228 (namely, in the z-direction through the drawing sheet). As illustrated, the peripheral magnets 220 are circumferentially arranged with alternating polarities about the drive axis. Thus, for each peripheral magnet 220, the polarity (e.g., N) at the inside face 248 is opposite to the polarity (e.g., S) at the inside faces 248 of the peripheral magnets 220 adjacent to that peripheral magnet 220.

Figure 2B:
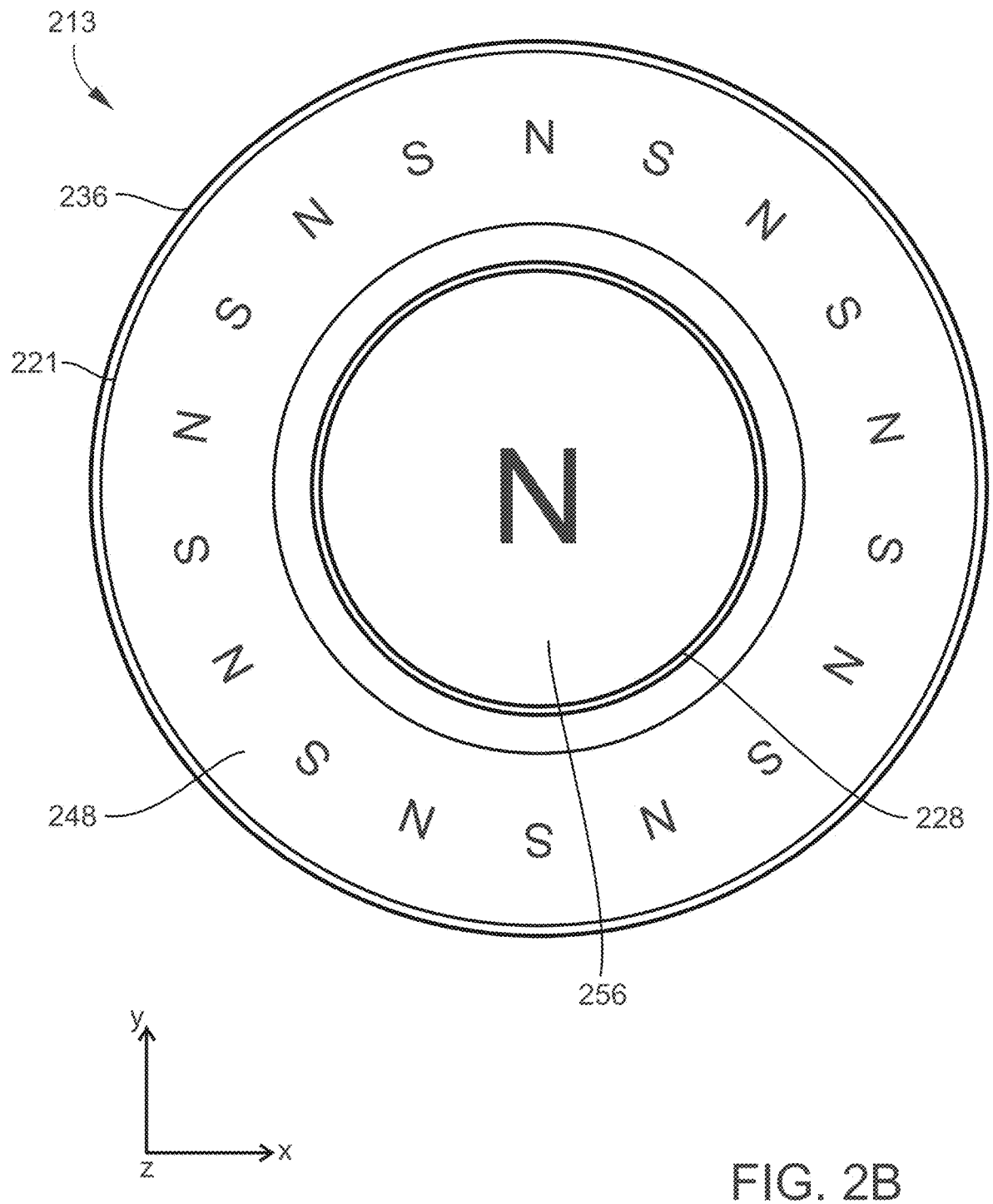
FIG. 2B is a schematic plan view of an example of a magnet assembly according to another embodiment of the present disclosure.

As an alternative, FIG. 2B is a schematic plan view of an example of a magnet assembly 213 according to another embodiment. The magnet assembly 213 includes a balancing magnet 228 positioned on the drive (central) axis, and a peripheral magnet 221. The balancing magnet 228 and peripheral magnet 221 may be mounted to and supported by an appropriately configured magnet support structure 236 that can be coupled to a shaft for rotation with the shaft. In this embodiment, instead of being an array of individual magnets, the peripheral magnet 221 (as the drive magnet or the driven magnet) may be realized as a single (continuous, contiguous, unitary, monolithic, etc.) annular (i.e., ring-shaped or donut-shaped) magnet positioned at a radial distance from the drive axis and coaxially surrounding the balancing magnet 228. Such an annular structure may be magnetized with a plurality of circumferentially arranged magnetic (north-south) dipoles with alternating polarities parallel to the drive axis, as appreciated by persons skilled in the art. In this embodiment, the support structure 236 and the peripheral magnet 221 may be combined into a single component. Likewise, the balancing magnet 228 could be combined into this single component as well.

In an embodiment, the magnet assembly 212 or 213 is representative of both the drive magnet assembly 112 and the driven magnet assembly 116 illustrated in FIG. 1. That is, the drive magnet assembly 112 and the driven magnet assembly 116 may have the same configuration, or may be mirror images of each other. In such embodiment, the peripheral magnet(s) 220 or 221 is/are representative of both the drive magnets 120 and the driven magnets 124. Additionally, the balancing magnet 228 is representative of both the first balancing magnet 128 and the second balancing magnet 132. Alternatively, one of the drive magnet assembly 112 or the driven magnet assembly 116 may have a multi-magnet configuration such as illustrated in FIG. 2A, while the other has a single-magnet configuration such as illustrated in FIG. 2B.

The drive magnet assembly 112 and the driven magnet assembly 116, particularly the array of drive magnets 120 and the array of driven magnets 124, are configured to drive rotation of the driven magnet assembly 116 (and thus the driven magnets 124) in response to rotation of the drive magnet assembly 112 (and thus the drive magnets 120). An example of such configuration is described above in conjunction with FIGS. 1, 2A and 2B. In practice, the axial magnetic coupling assembly 100 is installed (coupled) between a prime mover or source of rotational power such as a (for example electric) motor and a load that consumes the rotational power such as a rotor (for example as part of a pumping mechanism). In this case, the drive shaft 104 is (or is coupled to) the motor shaft, and the driven shaft 108 is (or is coupled to) the rotor. Upon rotation of the drive shaft 104 (e.g., as powered by a motor), the drive magnet assembly 112 rotates with the drive shaft 104. Due to the contactless magnetic coupling established between the drive magnets 120 and the driven magnets 124 across the axial gap 144, the rotation of the drive magnet assembly 112 drives (or induces) rotation of the driven magnet assembly 116. The rotation of the driven magnet assembly 116 thereby rotates the driven shaft 108 coupled thereto, and consequently drives rotation of a rotor or other load coupled to the driven shaft 108.

The rotation caused by the magnetic coupling is due to a relative angular displacement, d, about the drive axis L of the driven coupling 116 relative to the drive coupling 112. This relative angular displacement, d, results in a tangential drive force, Ft, about the drive axis L from the drive coupling's drive magnets 120 to the driven coupling's driven magnets 124 (as depicted in FIG. 2A) resulting in a drive torque, T. Consequently, as the drive magnets 120 rotate (in the transverse or x-y plane) in a certain (clockwise or counterclockwise) direction, the drive magnets 120 pull on or drag the driven magnets 124 to rotate in the same direction. As this relative angular displacement, d, increases there is an increase in drive torque, T, but only up to a point where the drive torque reaches a maximum value, Tmax, (i.e. "pull-out torque") dictated by the magnetic coupling's design parameters (i.e. diameter, air gap, number of pole pairs, magnetic strength, etc.). If the "pull-out torque" of the magnetic coupling 100 is exceeded, the magnetic coupling 100 will slip into an asynchronous mode and may require the pump to which the magnetic coupling 100 is coupled to be stopped and restarted for proper engagement and synchronous operation of the magnetic coupling 100. Along with the beneficial drive torque, T, there is an axial attractive force, FA, across the axial gap 144 between the drive magnets 120 and driven magnets 124 which decreases as the relative angular displacement, d, increases. For example, FIG. 1 depicts by arrows 164 the axial attractive force between the north poles at the inside faces 148 of two drive magnets 120 and, respectively, the south poles at the inside faces 152 of two corresponding driven magnets 124. Likewise, an axial attractive force in the direction of arrows 164 is generated between the south poles at the inside faces 148 of other drive magnets 120 and the north poles at the inside faces 152 of other driven magnets 124. Typically, this undesirable axial attractive force, FA, at full load operation up to the "pull-out torque" is still a relatively large fraction of the maximum axial attractive force, FAmax, (i.e., the axial force when the relative angular displacement, d, is zero).

Figure 8:
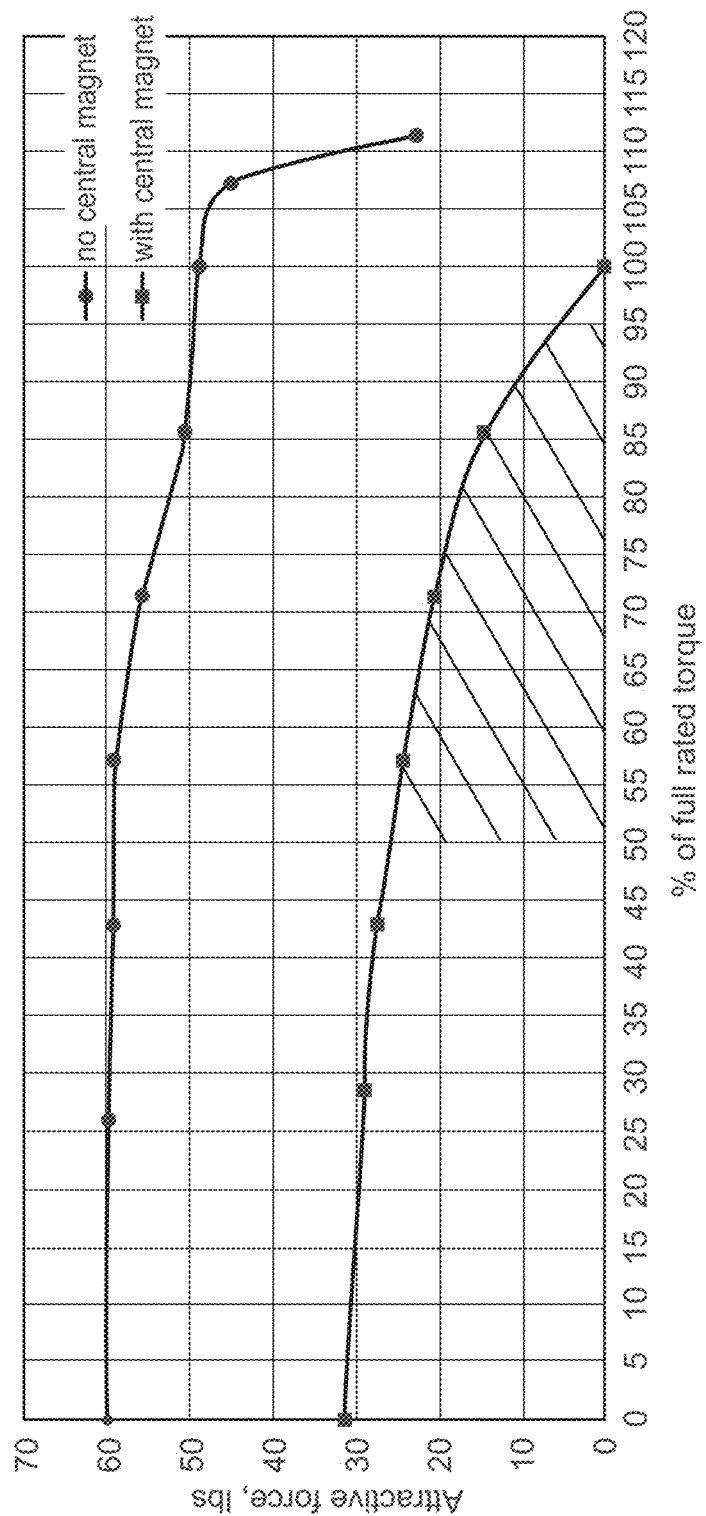
FIG. 8 is a plot of attractive force (in pounds, lbs) as a function of percent (%) of full rated torque generated by an axial magnetic coupling, in a case where the coupling includes balancing magnets according to the present disclosure as compared to a case where the coupling does not include balancing magnets.

FIG. 8 shows a relationship between the beneficial drive torque, T, and the undesirable axial force, FA, as experimentally determined by the inventor. As appreciated by persons skilled in the art, the drive torque T and axial attractive force FA can also be calculated theoretically (as a function of the relative angular displacement, d) from the magnetic B field and an integration of the resulting Maxwell Stress Tensor over a closed surface containing either the drive or driven coupling. The theory shows that there needs to be a helical twisting of the magnetic B field in the air gap about the drive axis L caused by the relative angular displacement, d, in order to generate a drive torque between the drive and driven coupling. The hatched area in FIG. 8 corresponds to a typical operating range for a scroll vacuum pump. It is evident that the counterbalancing achieved by the present teachings is able to drastically reduce the axial force. The force reduction is to a point where the relevant bearings of the pumping system can react the axial force without a significant loss of life. Bearing life is typically inversely proportional to roughly the cube of the load. Hence, even a reduction in bearing load by a factor of 2 (such as shown in FIG. 8) may result in an increase in bearing life by a factor of 8.

As noted in the Background section, depending on the physical size and magnetic strength (or flux density) of the drive magnets 120 and driven magnets 124 in a given axial magnetic coupling assembly 100, the axial attractive forces generated between the drive magnet assembly 112 and the driven magnet assembly 116 can be large. The system in which the axial magnetic coupling assembly 100 operates must be able to support these large axial attractive forces by deploying suitable load-bearing components such as bearings (e.g., axial thrust bearings, roller bearings designed to react axial forces, bushings, etc.). According to an aspect of the present disclosure, the first balancing magnet 128 and the second balancing magnet 132 are provided to counteract the axial attractive forces by generating an on-axis, counterbalancing axial repulsive force, as depicted by an arrow 168 in FIG. 1. That is, the first balancing magnet 128 and the second balancing magnet 132 are configured to generate an axial repulsive force between the first balancing magnet 128 and the second balancing magnet 132. The axial repulsive force is effective to counterbalance the axial attractive force(s) existing in and/or developed by the axial magnetic coupling assembly 100. Depending on the embodiment, the axial repulsive force may be large enough to completely balance the axial attractive forces and thereby effectively zero out the net axial force produced by the axial magnetic coupling assembly 100 in operation, or to at least partially balance the axial attractive forces and thereby effectively reduce the net axial force produced by the axial magnetic coupling assembly 100 in operation. In either case, the counterbalancing axial repulsive force provided by the first balancing magnet 128 and the second balancing magnet 132 is advantageous because it reduces the axial load required to be borne by the system associated with the axial magnetic coupling assembly 100, thereby avoiding any requirement for costly and/or complex load-bearing components.

Accordingly, in the context of the present disclosure, the term "counterbalance" (or even the term "balance") encompasses providing an offset or opposing force or forces to the axial attractive forces effective to either partially balance (and significantly partially balance if desired) or fully balance the axial attractive forces, and thereby either reduce (and significantly reduce if desired) or eliminate the net axial force produced by the axial magnetic coupling assembly 100 in operation. Thus, depending on the embodiment, the counterbalancing axial repulsive force may be less than, equal to, or greater than the axial attractive force(s) being offset or opposed by the first balancing magnet 128 and second balancing magnet 132. FIG. 8 (discussed above) shows a typical reduction in axial load with and without a central balancing magnet as a percentage of the maximum drive torque of the coupling (i.e. "pull-out torque").

As noted above, in the embodiment illustrated in FIGS. 1 and 2, the first balancing magnet 128 and the second balancing magnet 132 have magnetic dipole configurations, with the magnetic field lines running through the axial thicknesses of the first balancing magnet 128 and the second balancing magnet 132. In this case, the first balancing magnet 128 and the second balancing magnet 132 are oriented such that the polarity of the first balancing magnet 128 at its inside face 156 is the same as the polarity of the second balancing magnet 132 at its inside face 160, thereby generating the axial repulsive force across the axial gap 144 between the first balancing magnet 128 and the second balancing magnet 132. Thus, in the illustrated example, the respective north poles of the first balancing magnet 128 and the second balancing magnet 132 face each other across the axial gap 144. As an alternative, the orientation of the first balancing magnet 128 and the second balancing magnet 132 could be reversed such that their respective south poles faced each other to generate the same or similar axial repulsive force.

Figure 3:
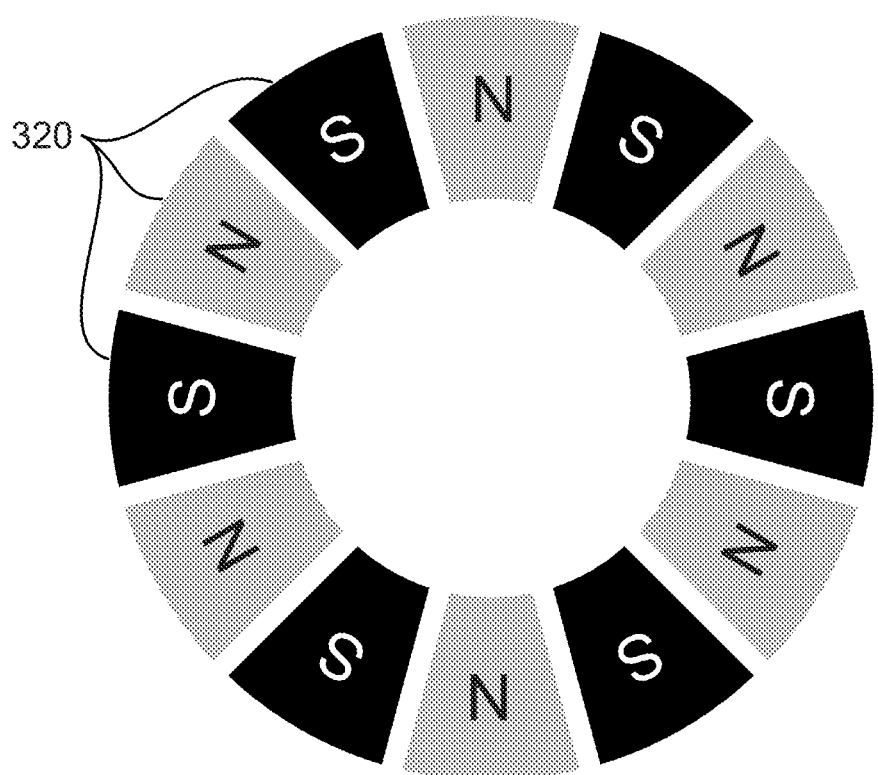
FIG. 3 is a schematic plan view of an example of an array of peripheral magnets according to another embodiment of the present disclosure.

FIG. 3 is a schematic plan view of an example of an array of peripheral magnets 320 according to another embodiment. Here, the peripheral magnets 320 are wedge-shaped, or shaped as truncated pie slices. In an embodiment, the peripheral magnets 320 are representative of both the drive magnets 120 and the driven magnets 124. Alternatively, as described above, the magnetic field generated by the array of peripheral magnets 320 could be achieved by a single annular (e.g., donut-shaped) magnet that is magnetized with a similar number of peripherally spaced alternating north-south dipoles.

Figure 4:
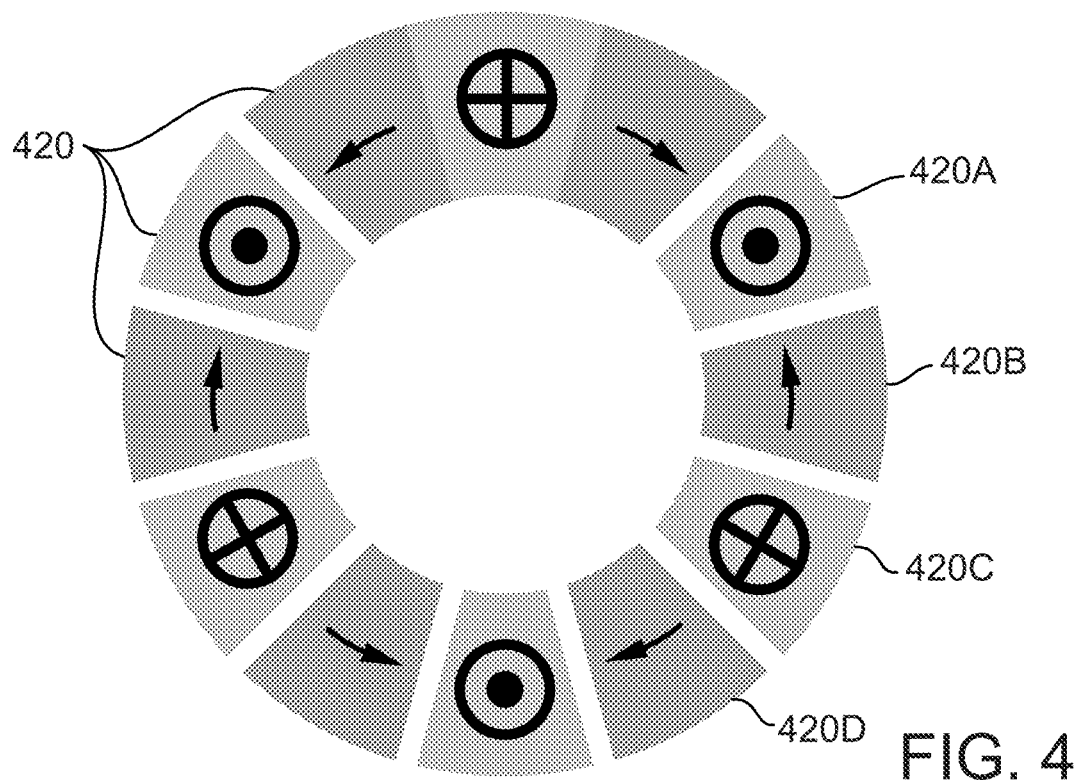
FIG. 4 is a schematic plan view of an example of an array of peripheral magnets according to another embodiment of the present disclosure.

FIG. 4 is a schematic plan view of an example of an array of peripheral magnets 420 according to another embodiment. This embodiment differs from those illustrated in FIGS. 1-3 in that the peripheral magnets 420 are configured as a Halbach array. Halbach arrays are known to persons skilled in the art, and thus need not be described in detail herein. Briefly, in a Halbach array, the peripheral magnets 420 are permanent magnets exhibiting, from one magnet to the next, a spatially rotating pattern of magnetization (or magnetic flux distribution). Thus, in the simplified schematic view of FIG. 4, the magnetization (and orientation of the magnetic field) is directed out of the transverse plane (the plane of the drawing sheet) in magnet 420A, as depicted by the dot-in-circle symbol. The magnetization has components directed or tilted in one angular direction (e.g., counterclockwise) in magnet 420B, as depicted by the arrow. The magnetization is directed into the transverse plane in magnet 420C, as depicted by the cross-in-circle symbol. The magnetization has components directed or tilted in the other angular direction (e.g., clockwise) in magnet 420D, as depicted by the arrow. This pattern repeats around the remainder of the array. The pattern results in one side of the array having a significantly strengthened magnetic field (relative to the other side) while the opposite side of the array has a near-zero strength (or nearly canceled) magnetic field. In an embodiment, the peripheral magnets 420 may be utilized as both the drive magnets 120 and the driven magnets 124, with the strong sides facing each other across the axial gap 144. The Halbach array may be preferable to the more common alternating polarity array shown in FIG. 2 in certain cases, such as where for a given magnet size the Halbach array provides a stronger magnetic field (and a stronger magnetic field is desired), or where the weaker side of the Halbach array enables a simpler design of the supporting or backing structure of the drive/driven magnet assembly 112/116.

Figure 5:
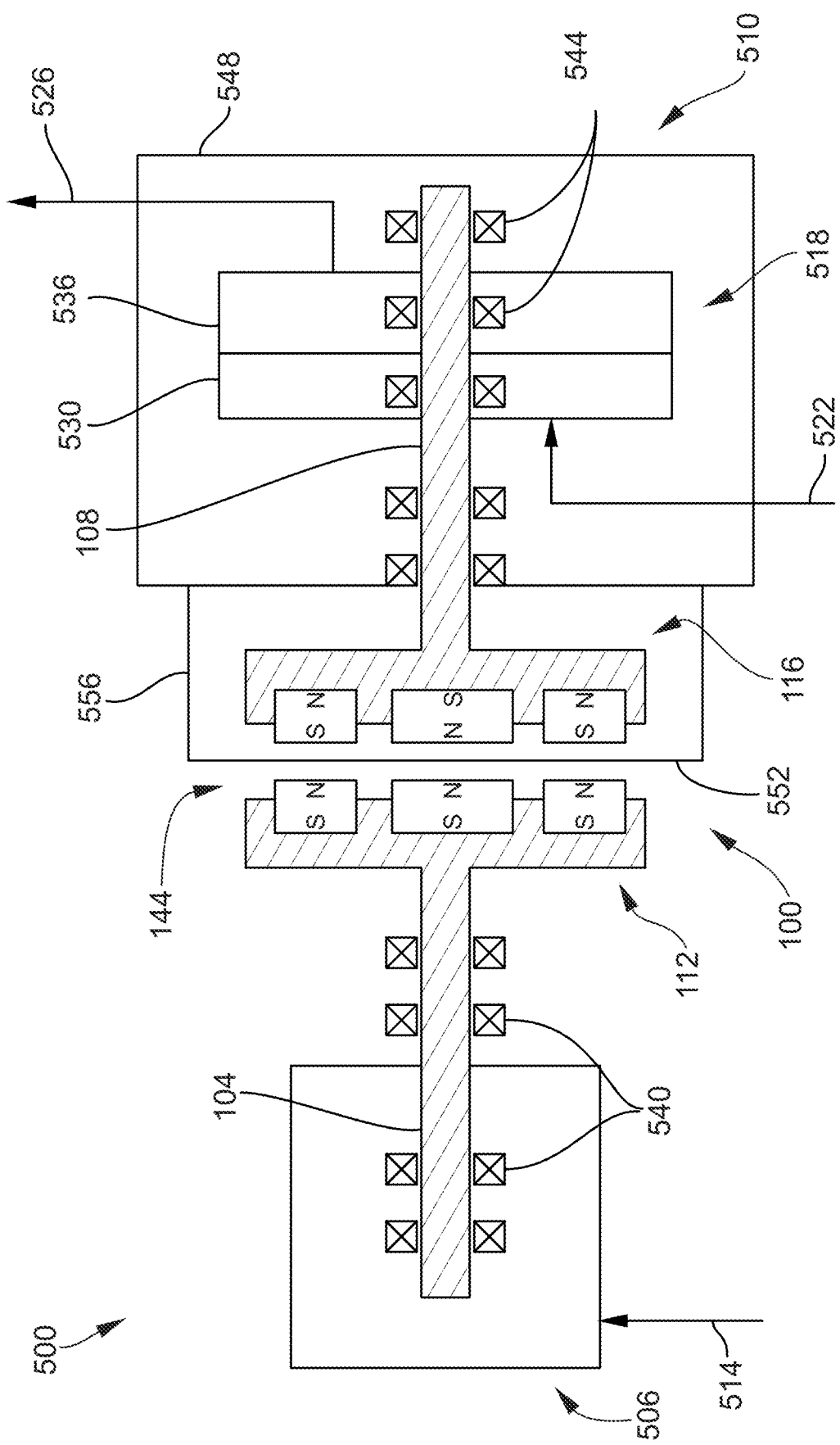
FIG. 5 is a schematic view of an example of a pump (or pumping) assembly according to an embodiment of the present disclosure.

FIG. 5 illustrates one non-limiting example of a system-level or apparatus-level implementation of the subject matter disclosed herein. Specifically, FIG. 5 is a schematic view of an example of a pump (or pumping) assembly 500 according to an embodiment. The pump assembly 500 includes a (balanced) axial magnetic coupling assembly according to any of the embodiments disclosed herein, such as the axial magnetic coupling assembly 100 described above in conjunction with FIGS. 1-4.

The pump assembly 500 generally may include a suitable motor 506 disposed on the drive side of the axial magnetic coupling assembly 100, and a pump head (assembly) 510 disposed on the driven side of the axial magnetic coupling assembly 100. As described above, the axial magnetic coupling assembly 100 intercouples the motor 506 and the pump head 510 in a contactless manner. The motor 506 is configured to generate rotational power and transfer it to the drive shaft 104, which is or is coupled to a motor shaft of the motor 506. The axial magnetic coupling assembly 100 is configured to transfer the rotational power from the drive shaft 104 to the driven shaft 108, which is or is coupled to a pump shaft of the pump head 510, via the drive magnet assembly 112 and the driven magnet assembly 116 as described above. The driven shaft 108 rotates or orbits one or more rotatable or orbital components of the pump head 510, which depending on the type or configuration of the pump head 510.

The motor 506 generally may be any suitable motor such as an electric motor. Accordingly, the motor 506 is connected to a suitable power input 514 such as an electrical power input.

The pump head 510 generally may include one or more pumping stages 518 communicating with a pump inlet 522 and a pump outlet 526. The pump inlet 522 schematically represents one or more fluid conducting components (pipes, passages, chambers, valves, etc.) utilized to supply fluid to the pumping stage 518, i.e., the working fluid to be pumped, which may be a gas or a liquid depending on the embodiment. The pump outlet 526 schematically represents one or more fluid conducting components (pipes, passages, chambers, valves, etc.) utilized to conduct outputted fluid away from the pumping stage 518. Generally, the pump inlet 522 is associated with the low-pressure side of the pumping stage 518, and the pump outlet 526 is associated with the high-pressure side of the pumping stage 518. Generally, no limitation is placed on the type or configuration of the pump head 510. The pump head 510 may represent a vacuum pump utilized to evacuate (or pump down) a chamber communicating with the pump inlet 522, or a compression pump utilized pressurize and/or transport a fluid at a desired pressure and/or flow rate. For all such purposes, the pumping stage 518 generally may include one or more pump rotors 530 and one or more pump stators (or housings) 536. The pump rotor 530 is coupled to, and therefore rotates or orbits with, the driven shaft 108. The pump rotor 530 rotates or orbits relative to the pump stator (or housing) 536, which is a stationary component. Generally, the pump rotor 530 and the pump stator (or housing) 536 cooperatively define one or more fluid flow paths through which the working fluid is conducted (pumped) through the pumping stage 518, as appreciated by persons skilled in the art. The pump head 510 further generally includes a pump housing 548. As appreciated by persons skilled in the art, the pump stator 536 and the pump housing 548 are often combined or integrated (i.e., as a single structure or component) to perform both the functions of a stator and a housing instead of being two or more separate components.

The type or configuration of the pump rotor 530 (and corresponding pump stator 536) depends on the embodiment. Examples of pump rotors 530 include, but are not limited to, an orbiting scroll, a rotary vane component, a crank, a cam, a gear, a screw, a Roots rotor (e.g., lobe), and a claw, all of which are generally understood by persons skilled in the art. Accordingly, examples of the pumping stage 518 include, but are not limited to, a scroll pumping stage, a rotary vane pumping stage, a gear pumping stage, a screw compressor stage, a Roots pumping stage, and a claw pumping stage, again all of which are generally understood by persons skilled in the art.

The pump assembly 500 generally may have any type and number of bearings 540 on the drive side and bearings 544 on the driven side of the axial magnetic coupling assembly 100, as appreciated by persons skilled in the art. At least some of these bearings 540 and 544 are configured (e.g., designed and positioned) to bear the axial forces generated during operation of the pump assembly 500. As described herein, the axial magnetic coupling assembly 100 balances the additional axial forces it generates. Therefore, the use of the axial magnetic coupling assembly 100 may allow for the same bearings 540 and 544 to be utilized in the pump assembly 500 (as would be utilized in a case where a more conventional mechanical coupling is provided between the motor 506 and the pump head 510). In other words, the pump assembly 500 may not require larger, special or non-standard designed, or additional bearings to accommodate the use of the axial magnetic coupling assembly 100.

The pump housing 548 may be configured in a manner appreciated by persons skilled in the art. The pump housing 548 may represent one or more components (e.g., cover, cowling, wall, etc.) that enclose the pumping stage 518, at least portions of the pump inlet 522 and pump outlet 526, pump-side bearings 544, and other internal components of the pump head 510. The pump housing 548 may include a frame that supports the pumping stage 518. As noted above, all or a portion of the pump stator 536 may be integral with, or attached to or supported by, the frame or other part of the pump housing 548. The pump housing 548 may further define one or more fluid passages of the pump inlet 522 and/or pump outlet 526. The pump housing 548 may also enclose and/or define a pump cooling system, such as a fan and associated air passages.

The contactless configuration of the axial magnetic coupling assembly 100 allows a structural boundary 552, such as a wall, plate, or the like, to be positioned in the axial gap 144 between the drive magnet assembly 112 and the driven magnet assembly 116. Preferably, to avoid eddy current losses (which may be significant), the structural boundary 552 is composed of an electrically insulating (non-electrically conductive) material. Examples of suitable electrically insulating materials for the structural boundary 552 include various organic polymers (plastics) and ceramics (e.g. glass). In an embodiment, the structural boundary 552 is composed of a liquid-crystal polymer (LCP) or an LCP-containing composite (for example, a combination of an LCP and a filler such as glass fiber). As appreciated by persons skilled in the art, LCPs are a class of aromatic polymers (e.g., aramids) processed to form a liquid crystalline phase. A structural boundary 552 constructed of an LCP is found to be advantageous for applications of the axial magnetic coupling assembly 100. The LCP material does not conduct electrical current and therefore avoids eddy current losses. The LCP material also exhibits high structural strength (high modulus) and therefore can withstand significant pressure differentials as may be encountered in a pumping application. Additionally, the LCP material exhibits a very low gas permeation rate compared to other polymers.

The role of the structural boundary 552 in conjunction with the axial magnetic coupling assembly 100 depends on the embodiment. In the embodiment illustrated in FIG. 5, the pump assembly 500 includes a casing 556 that encloses the driven side (e.g., driven magnet assembly 116) of the axial magnetic coupling assembly 100. The casing 556 may be integral with or attached to pump housing 548. The casing 556 may be, or be part of, a hermetic barrier of the pump head 510 configured to fluidly isolate all or part of the pump head 510 from the ambient (environment outside of the pump head 510). The structural boundary 552 described above may be, or be part of, the casing 556.

Figure 6A:
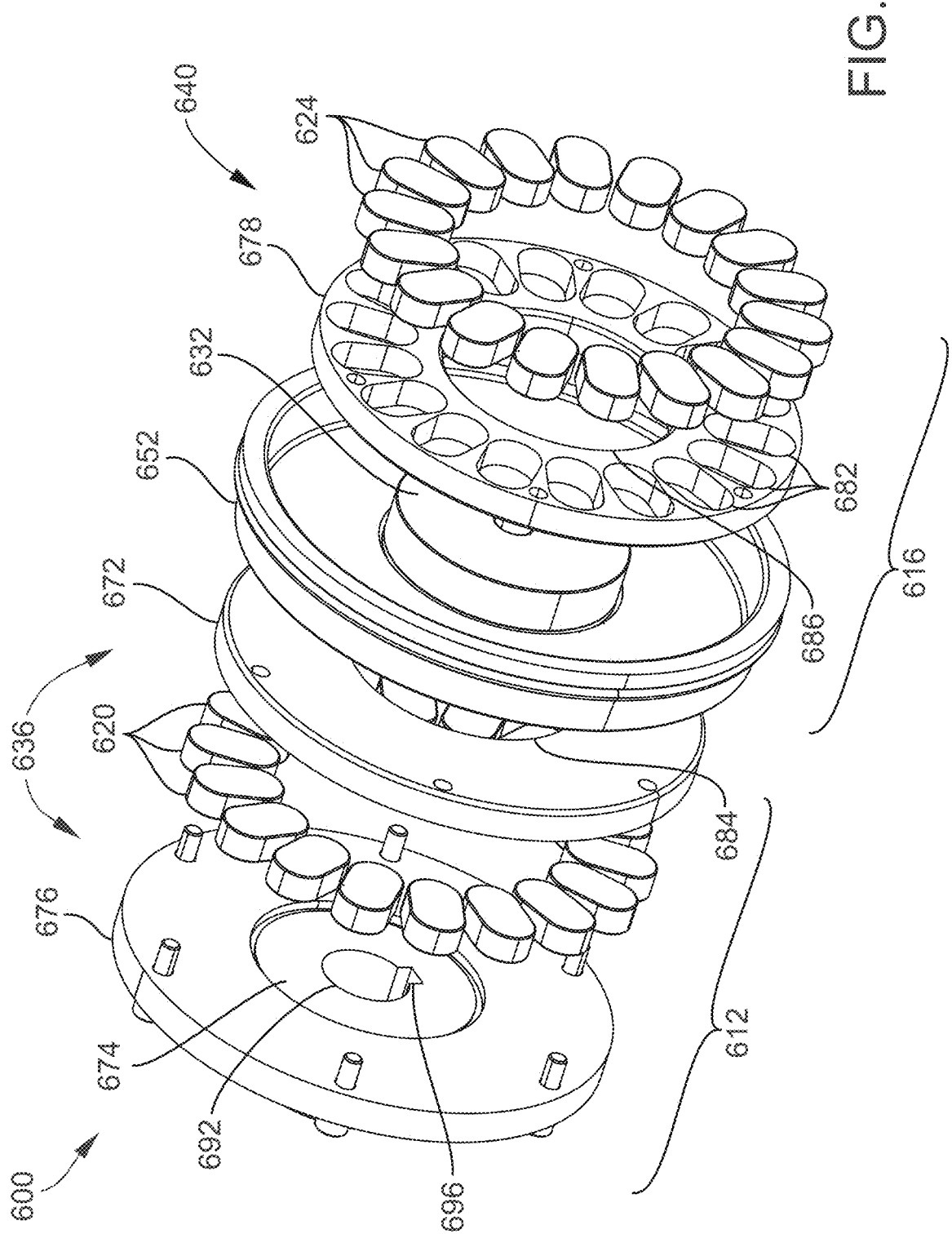
FIG. 6A is an exploded perspective view of an example of a (balanced) axial magnetic coupling assembly according to another embodiment of the present disclosure.
Figure 6B:
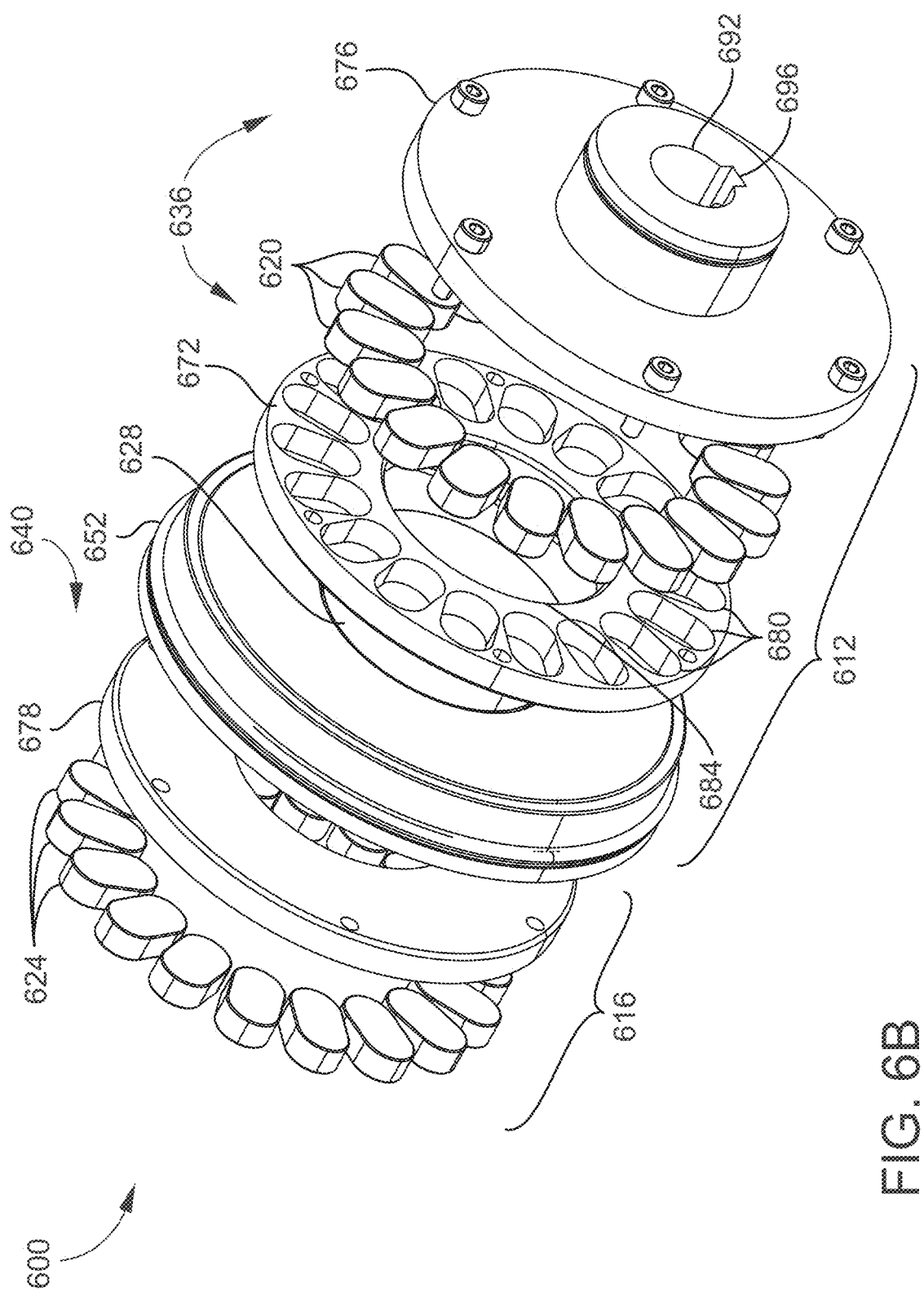
FIG. 6B is another exploded perspective view of the axial magnetic coupling assembly illustrated in FIG. 6A.
Figure 7A:
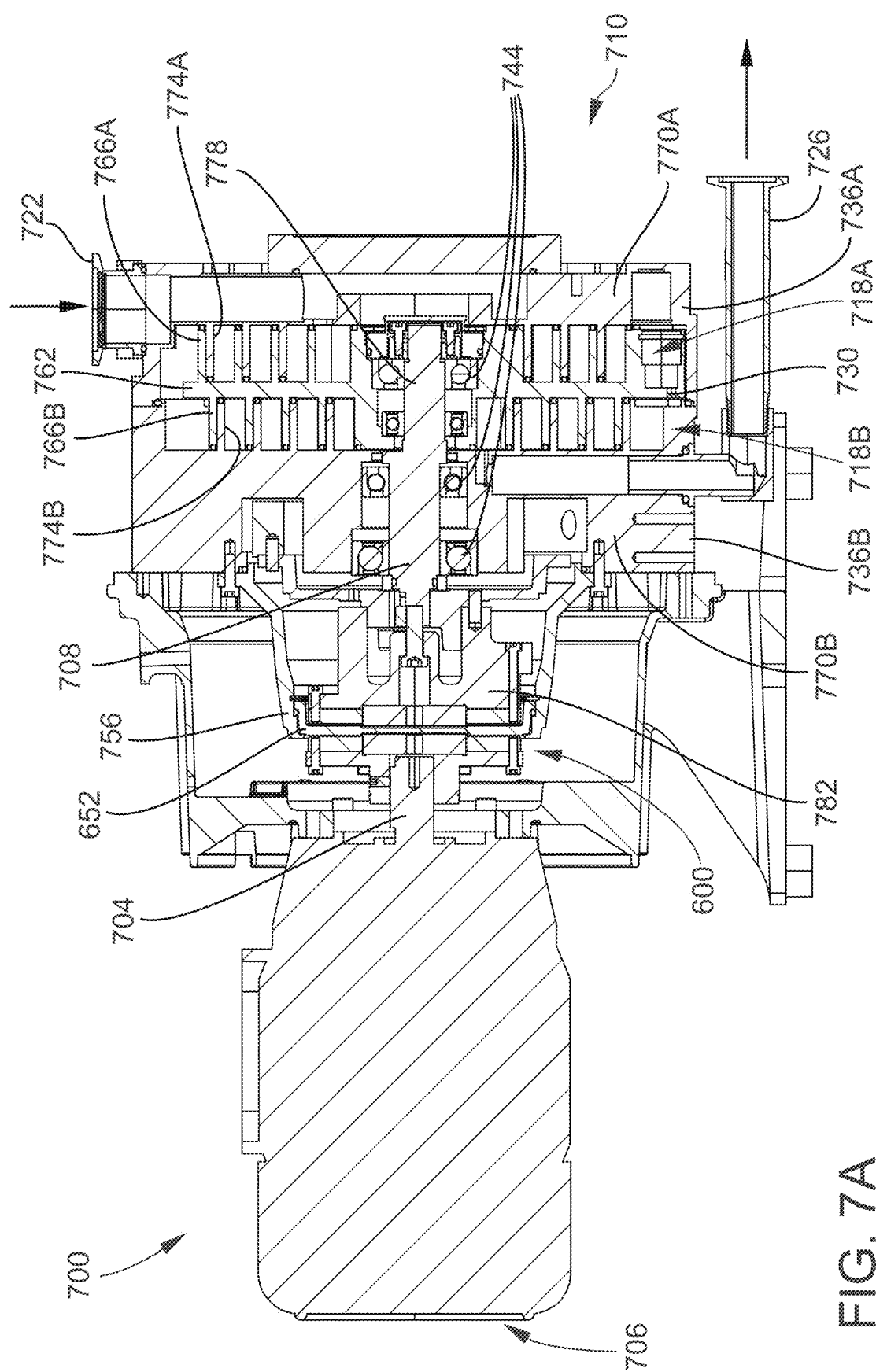
FIG. 7A is a schematic view of an example of a vacuum scroll pump (or pumping) assembly according to an embodiment of the present disclosure.
Figure 7B:
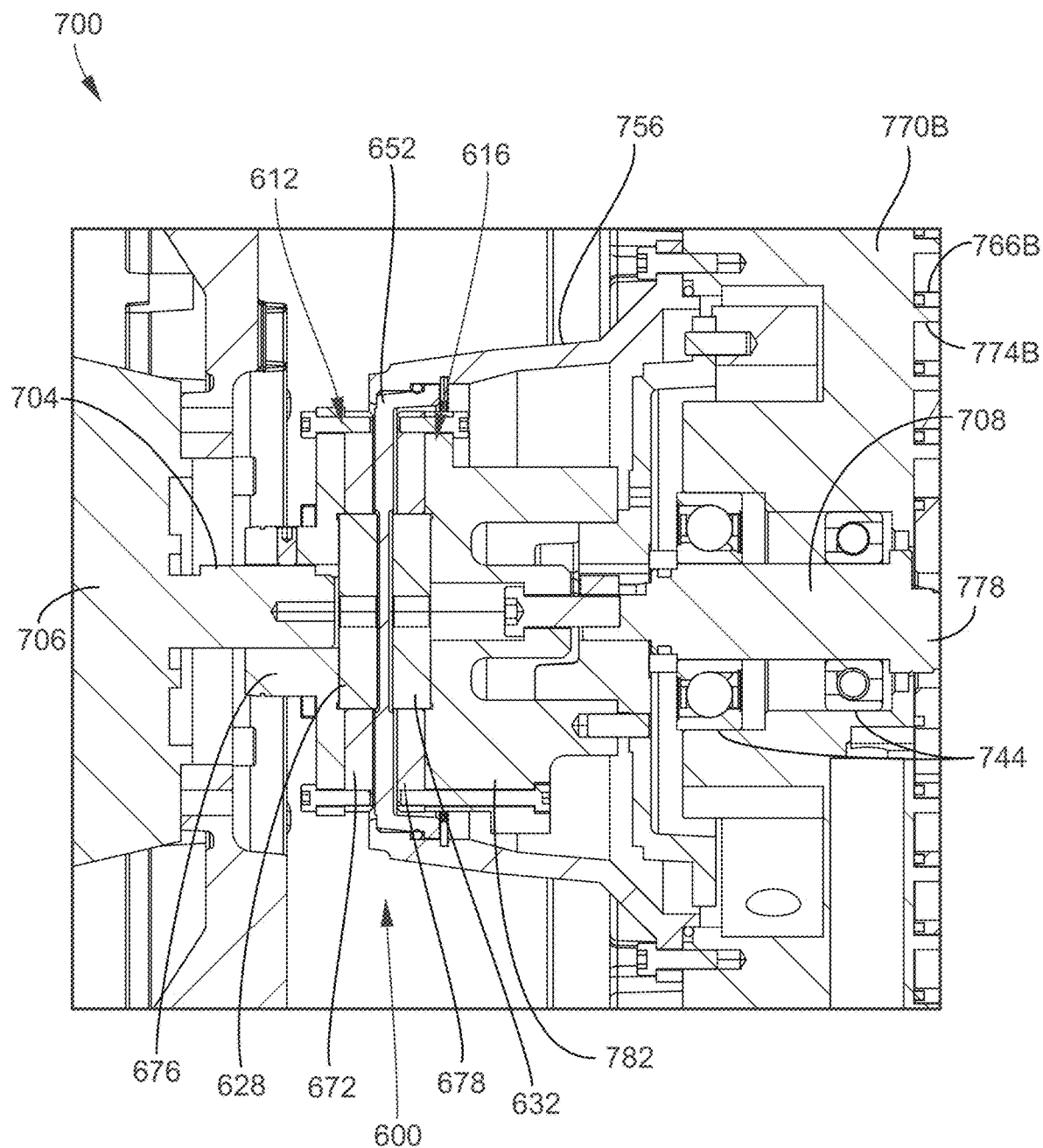
FIG. 7B is a close-up view of an axial magnetic coupling assembly and surrounding portions of the pump assembly illustrated in FIG. 7A.

FIG. 6A is an exploded perspective view of an example of a (balanced) axial magnetic coupling assembly 600 according to another embodiment of the present disclosure. FIG. 6B is another exploded perspective view of the axial magnetic coupling assembly 600. FIG. 6A is a view from the load side (e.g., pump side) and FIG. 6B is a view from the motor side of the axial magnetic coupling assembly 600. The axial magnetic coupling assembly 600 in assembled form is best shown in FIG. 7B.

The axial magnetic coupling assembly 600 generally includes a drive magnet assembly 612 configured to be coupled to a drive shaft (not shown), and a driven magnet assembly 616 configured to be coupled to a driven shaft (not shown). When assembled, the drive magnet assembly 612 and the driven magnet assembly 616 are separated by an axial gap as described herein. The axial magnetic coupling assembly 600 further includes a structural boundary 652 interposed in the axial gap between the drive magnet assembly 612 and the driven magnet assembly 616. The structural boundary 652 is composed of an electrically insulating material as described herein. In the present embodiment, the structural boundary 652 is provided in the form of a plate, disk, dish, or cap.

As in other embodiments, the drive magnet assembly 612 includes a first (drive-side) balancing magnet 628 (FIG. 6B) positioned on the drive axis and a plurality of peripheral drive magnets 620 coaxially surrounding the first balancing magnet 628. Similarly, the driven magnet assembly 616 includes a second (driven-side) balancing magnet 632 and a plurality of peripheral driven magnets 624 coaxially surrounding the second balancing magnet 632. The first balancing magnet 628 and second balancing magnet 632 face each other, and the drive magnets 620 and driven magnets 624 face each other, across the axial gap as described herein. The first balancing magnet 628, second balancing magnet 632, drive magnets 620, and driven magnets 624 may be configured according to any of the embodiments disclosed herein, such as any of those illustrated in FIGS. 1-5.

The drive magnet assembly 612 includes a drive magnet support structure 636. In the present embodiment, the drive magnet support structure 636 includes an annular drive (or first) magnet holder or retainer 672 and an annular drive-side (or first) hub 676. The drive magnet holder 672 is configured to hold (retain, fix, etc.) the drive magnets 620 in their arrayed position and support their rotation about the drive axis. For this purpose, in the present embodiment, the drive magnet holder 672 includes a plurality of drive magnet receptacles 680 in which the drive magnets 620 are respectively mounted. The drive magnet holder 672 also has a central bore 684 to accommodate the first balancing magnet 628. The drive-side hub 676 is configured to securely couple the drive magnet holder 672 with the drive magnets 620 to the drive shaft. For this purpose, the drive-side hub 676 has a central bore 692 through which the drive shaft passes. By way of illustrated example, the central bore 692 of the drive-side hub 676 includes a keyway 696 configured to engage a key on the drive shaft. The drive-side hub 676 may further include a central recess 674 for receiving the first balancing magnet 628.

Similarly, the driven magnet assembly 616 includes a driven magnet support structure 640. In the present embodiment, the driven magnet support structure 640 includes a driven (or second) magnet holder or retainer 678 and a driven-side (or second) hub 782 (FIGS. 7A and 7B). The driven magnet holder 678 is configured to hold (retain, fix, etc.) the driven magnets 624 in their arrayed position and support their rotation about the drive axis. For this purpose, in the present embodiment, the driven magnet holder 678 includes a plurality of driven magnet receptacles 682 in which the driven magnets 624 are respectively mounted. The driven magnet holder 678 also has a central bore 686 to accommodate the second balancing magnet 632. The driven-side hub 782 is configured to securely couple the driven magnet holder 678 with the driven magnets 624 to the driven shaft, as best shown in FIG. 7B. The driven-side hub 782 may further include a central recess (see FIGS. 7A and 7B) for receiving the second balancing magnet 632.

The respective sets of components of the drive magnet assembly 612 and the driven magnet assembly 616 may be secured together by any suitable means such as, for example bolts and corresponding threaded holes that clamp the components together in the axial direction(s). If desired, additional means may be taken to secure the various magnets in their respective receptacles or recesses, such as press-fitting, adhesive, etc. In a further embodiment and as illustrated, the structural boundary 652 may include central recesses at its drive side and driven side to at least partially accommodate the first balancing magnet 628 and the second balancing magnet 632, respectively.

FIG. 7A is a schematic view of an example of a vacuum scroll pump (or pumping) assembly 700 according to another embodiment, as another non-limiting example of a system-level or apparatus-level implementation of the subject matter disclosed herein. The pump assembly 700 includes a (balanced) axial magnetic coupling assembly according to any of the embodiments disclosed herein. In the illustrated example, the pump assembly 700 includes the axial magnetic coupling assembly 600 described above in conjunction with FIGS. 6A and 6B. FIG. 7B is a close-up view of the axial magnetic coupling assembly 600 and surrounding portions of the pump assembly 700. The structure and operation of vacuum scroll pumps are generally understood by persons skilled in the art, and thus the pump assembly 700 and certain components thereof are descried only briefly herein to provide a context for the presently disclosed subject matter.

The pump assembly 700 generally includes a motor 706 disposed on the drive side of the axial magnetic coupling assembly 600, and a pump head (assembly) 710 disposed on the driven side of the axial magnetic coupling assembly 600. As described above, the axial magnetic coupling assembly 600 intercouples the motor 706 and the pump head 710 in a contactless manner via a drive shaft 704 and a driven shaft 708, respectively.

The pump head 710 generally may include one or more pumping stages communicating with a pump inlet 722 and a pump outlet 726. In the present embodiment, the pump head 710 includes a first (or upstream) pumping stage 718A fluidly communicating in series (with respect to the fluid flow path) with a second (or downstream) pumping stage 718B. The first pumping stage 718A receives the (lower-pressure) working fluid from the pump inlet 722, compresses the fluid, and outputs the compressed fluid to the second pumping stage 718B. The second (or downstream) pumping stage 718B further compresses the fluid, and discharges the (now even higher-pressure) fluid to the pump outlet 726. In this example, the multi-stage compression mechanism of the pump head 710 is defined by a pump rotor 730 in the form of an orbiting plate scroll, a first pump stator 736A in the form of a first stationary plate scroll, and a second pump stator 736B in the form of a second stationary plate scroll. The pump rotor 730 (orbiting plate scroll) is interposed between, and orbits relative to, the first pump stator 736A (first stationary plate scroll) and the second pump stator 736B (second stationary plate scroll). The pump rotor 730 (on one axial side thereof) and the first pump stator 736A cooperatively define the first pumping stage 718A, and the pump rotor 730 (on the opposite axial side thereof) and the second pump stator 736B cooperatively define the second pumping stage 718B.

The pump rotor 730 includes an orbiting plate 762 that orbits in the transverse plane (the plane orthogonal to the drive axis of the axial magnetic coupling assembly 600, as described above). The pump rotor 730 further includes a first orbiting scroll blade 766A that extends (or projects) axially from the orbiting plate 762 toward the first pump stator 736A, and a second orbiting scroll blade 766B that extends (or projects) axially in the opposite direction from the orbiting plate 762 toward the second pump stator 736B. The first pump stator 736A includes a first stationary plate 770A, and a first stationary scroll blade 774A that extends (or projects) axially from the first stationary plate 770A toward the pump rotor 730. The second pump stator 736B includes a second stationary plate 770B, and a second stationary scroll blade 774B that extends (or projects) axially in the opposite direction from the second stationary plate 770B toward the pump rotor 730.

The first orbiting scroll blade 766A, second orbiting scroll blade 766B, first stationary scroll blade 774A, and second stationary scroll blade 774B are shaped as spirals (i.e., run along a spiral path) in the transverse plane, as appreciated by persons skilled in the art. The cross-sectional view of FIG. 7A shows the several turns or wraps of the spiral-shaped blades. As illustrated, the first orbiting scroll blade 766A is juxtaposed with the first stationary scroll blade 774A in the radial direction (relative to the longitudinal axis of the pump assembly 700), such that the first orbiting scroll blade 766A and the first stationary scroll blade 774A are nested together with a clearance and a predetermined relative angular positioning. By this configuration, one or more pockets are defined in the first pumping stage 718A by (and between) the nested first orbiting scroll blade 766A and first stationary scroll blade 774A. Likewise, the second orbiting scroll blade 766B is juxtaposed with the second stationary scroll blade 774B in the radial direction, such that the second orbiting scroll blade 766B and the second stationary scroll blade 774B are nested together with a clearance and a predetermined relative angular positioning. By this configuration, one or more pockets are defined in the second pumping stage 718B by (and between) the nested second orbiting scroll blade 766B and second stationary scroll blade 774B.

In the present embodiment, the driven shaft 708 is a crank shaft that is part of an eccentric drive mechanism. The main portion of the driven shaft 708 rotates on the drive axis as described above, and is attached to the driven-side (or second) hub 782 of the axial magnetic coupling assembly 600. At the end axially opposite to the axial magnetic coupling assembly 600, the driven shaft 708 includes (is integral with or coupled to) an eccentric member or crank 778. The crank 778 is coupled to the pump rotor 730. Various bearings 744 support the rotation of the driven shaft 708, the coupling of the crank 778 with the pump rotor 730, and the axial loads associated with the operation of the pump head 710. As in other embodiments, the use of the axial magnetic coupling assembly 600 allows for the bearings 744 to be the same type of standard bearings that would be utilized in a case where a more conventional mechanical coupling is provided between the motor 706 and the pump head 710.

As illustrated, the central longitudinal axis of the crank 778 is radially offset from the central longitudinal axis of (the main portion of) the driven shaft 708 (which is coincident with the drive axis of the axial magnetic coupling assembly 600). Consequently, rotation of the driven shaft 708 causes the crank 778, and in turn the pump rotor 730, to orbit (rotate in an orbiting manner) around the drive axis. Accordingly, rotation of the driven shaft 708 causes the first orbiting scroll blade 766A to orbit relative to the first stationary scroll blade 774A, and the second orbiting scroll blade 766B to orbit relative to the second stationary scroll blade 774B. These motions cause the pockets between the nested pairs of blades to vary in volume and to move within the first pumping stage 718A and second pumping stage 718B in a manner whereby the pockets are selectively placed in open communication with the pump inlet 722 (or preceding pumping stage) and the pump outlet 726 (or succeeding pumping stage). As a result, the working fluid is conducted from the pump inlet 722, through the first pumping stage 718A, through the second pumping stage 718B, and to the pump outlet 726, and is compressed in each of the first pumping stage 718A and second pumping stage 718B.

The pump assembly 700 further includes a casing 756 that encloses the driven side of the axial magnetic coupling assembly 600. The casing 756 may be attached (in a fluid-sealed manner, if desired) to a stationary part of the pump head 710, such as a frame, the back of the second pump stator 736B, etc. The above-described structural boundary 652 positioned in the axial gap of the axial magnetic coupling assembly 600 may be an integral part of, or attached to, the casing 756. The casing 756 and structural boundary 652 may be, or be part of, a hermetic barrier of the pump head 710.

It will be understood that the multi-stage scroll pump configuration described above and illustrated in FIGS. 7A and 7B is but one example of a scroll pump in which the presently disclosed subject matter may be implemented. In another embodiment, the pump assembly 700 may include a single scroll pump stage, i.e., a single nested pair of an orbiting scroll blade and a stationary scroll blade. Scroll pumps are further described in, for example, U.S. Pat. No. 9,341,186 and U.S. Patent Application Pub. No. 2015/0078927, the entire contents of each of which are incorporated herein by reference.

The structural boundary 552 or 652 described above is useful in any configuration of the magnetic coupling. Accordingly, in addition to axial magnetic couplings, other embodiments of the present disclosure encompass any magnetic couplings incorporating the structural boundary 552 or 652, including radial magnetic couplings as described herein.

It will be understood that terms such as "communicate with" and "in . . . communication with" (for example, a first component "communicates with" or "is in communication with" a second component), as well as "coupled to" or "coupled with," are used herein to indicate a structural, functional, mechanical, electrical, signal, optical, magnetic, electromagnetic, ionic or fluidic relationship between two or more components or elements. As such, the fact that one component is said to communicate with or be coupled to/with a second component is not intended to exclude the possibility that additional components may be present between, and/or operatively associated or engaged with, the first and second components.

It will be understood that various aspects or details of the invention may be changed without departing from the scope of the invention. Furthermore, the foregoing description is for the purpose of illustration only, and not for the purpose of limitation—the invention being defined by the claims.

What is claimed is:

1. A pump assembly, comprising:
a drive shaft rotatable on a drive axis;
a driven shaft rotatable on the drive axis;
a magnetic coupling assembly comprising:
  a drive magnet assembly coupled to the drive shaft, the drive magnet assembly comprising a first balancing magnet positioned on the drive axis, and a drive magnet coaxially positioned with the first balancing magnet;
  a driven magnet assembly coupled to the driven shaft, the driven magnet assembly comprising a second balancing magnet positioned on the drive axis, and a driven magnet coaxially positioned with the second balancing magnet, wherein:
    the drive magnet assembly is spaced from the driven magnet assembly by an axial gap, with the first balancing magnet facing the second balancing magnet across the axial gap, and the drive magnet facing the driven magnet across the axial gap;
    the drive magnet and the driven magnet are configured to drive rotation of the driven magnet in response to rotation of the drive magnet, and to generate an axial attractive force between the drive magnet and the driven magnet; and
    the first balancing magnet and the second balancing magnet are configured to generate an axial repulsive force between the first balancing magnet and the second balancing magnet that counterbalances the axial attractive force;
a pump head comprising a fluid inlet, a fluid outlet, and a pumping stage, the pumping stage comprising a pump rotor communicating with the driven shaft,
  wherein rotation of the drive shaft drives rotation of the pump rotor via the magnetic coupling assembly, and the pumping stage is configured to pump fluid from the fluid inlet to the fluid outlet in response to the rotation of the pump rotor;
a structural boundary disposed in the axial gap between the drive magnet assembly and the driven magnet assembly, wherein the structural boundary is composed of an electrically insulating material that is effective to prevent or minimize permeation of gases through the structural boundary including the fluid pumped by the pumping stage; and
a casing enclosing the driven magnet assembly, wherein the casing comprises the structural boundary and is attached to or integrated with the pump head, and the casing at least partially defines a hermetic barrier configured to fluidly isolate the driven magnet assembly and at least part of the pump head from an ambient outside the casing.

2. The pump assembly of claim 1, wherein the electrically insulating material is a liquid crystal polymer.

3. The pump assembly of claim 1, wherein the first balancing magnet comprises a first inside face and has a first polarity at the first inside face, the second balancing magnet comprises a second inside face facing the first inside face across the axial gap and has a second polarity at the second inside face, and the first polarity and the second polarity are the same.

4. The pump assembly of claim 1, wherein the drive magnet and the driven magnet comprise one of the following configurations:
the drive magnet comprises a plurality of drive magnets circumferentially spaced from each other about the drive axis and surrounding the first balancing magnet, and the driven magnet comprises a plurality of driven magnets circumferentially spaced from each other about the drive axis and surrounding the second balancing magnet;
the drive magnet comprises a plurality of drive magnets circumferentially arranged with alternating polarities about the drive axis, and the driven magnet comprises a plurality of driven magnets circumferentially arranged with alternating polarities about the drive axis;
the drive magnet comprises an annular structure magnetized with a plurality of dipoles circumferentially arranged with alternating polarities about the drive axis, and the driven magnet comprises an annular structure magnetized with a plurality of dipoles circumferentially arranged with alternating polarities about the drive axis;
the drive magnet is configured as a Halbach array, and the driven magnet is configured as a Halbach array.

5. The pump assembly of claim 1, wherein the pump rotor comprises one of: a rotary vane component; a crank; a cam; a gear; a screw; a Roots rotor; a claw.

6. The pump assembly of claim 1, wherein:
the pump rotor comprises an orbiting scroll blade;
the pumping stage further comprises a stationary scroll blade nested with the orbiting scroll blade; and
the orbiting scroll blade is configured to move in an orbiting manner relative to the stationary scroll blade in response to rotation of the driven shaft, to create at least one moving pocket between the orbiting scroll blade and the stationary scroll blade effective to pump fluid.

7. The pump assembly of claim 6, wherein the pumping stage further comprises a crank positioned in eccentric relation to the driven shaft and configured to move in an orbiting manner in response to rotation of the driven shaft, and the orbiting scroll blade is coupled to the crank.

8. A method for operating the pump assembly of claim 1, the method comprising:
rotating the drive magnet assembly about the drive axis to drive rotation of the driven magnet assembly about the drive axis via the magnetic coupling; and
counterbalancing the axial attractive force by generating an axial repulsive force between first balancing magnet and the second balancing magnet.

9. The method of claim 8, wherein the drive magnet assembly and the driven magnet assembly comprise one of the following configurations:

the drive magnet assembly comprises a plurality of drive magnets circumferentially spaced from each other about the drive axis, and the driven magnet assembly comprises a plurality of driven magnets circumferentially spaced from each other about the drive axis and facing the plurality of drive magnets across the axial gap;

the drive magnet assembly comprises a plurality of drive magnets circumferentially arranged with alternating polarities about the drive axis, and the driven magnet assembly comprises a plurality of driven magnets circumferentially arranged with alternating polarities about the drive axis;

the drive magnet assembly comprises an annular drive magnet magnetized with a plurality of dipoles circumferentially arranged with alternating polarities about the drive axis, and the driven magnet assembly comprises an annular driven magnet magnetized with a plurality of dipoles circumferentially arranged with alternating polarities about the drive axis;

the drive magnet assembly comprises a drive magnet configured as a Halbach array, and the driven magnet assembly comprises a driven magnet configured as a Halbach array.

* * * * *